US009774564B2

(12) United States Patent
Quan et al.

(10) Patent No.: US 9,774,564 B2
(45) Date of Patent: Sep. 26, 2017

(54) FILE PROCESSING METHOD, SYSTEM AND SERVER-CLUSTERED SYSTEM FOR CLOUD STORAGE

(75) Inventors: Xiao Fei Quan, Hangzhou (CN); Quirong Xue, Hangzhou (CN); Lei Zhuo, Hangzhou (CN); Nan Song, Hangzhou (CN); Wanli Song, Hangzhou (CN); Han Cheng, Hangzhou (CN)

(73) Assignee: Alibaba Group Holding Limited

( * ) Notice: Subject to any disclaimer, the term of this patent is extended or adjusted under 35 U.S.C. 154(b) by 352 days.

(21) Appl. No.: 13/576,213

(22) PCT Filed: May 31, 2012

(86) PCT No.: PCT/US2012/040169
§ 371 (c)(1),
(2), (4) Date: Jul. 31, 2012

(87) PCT Pub. No.: WO2012/173785
PCT Pub. Date: Dec. 20, 2012

(65) Prior Publication Data
US 2013/0073691 A1 Mar. 21, 2013

(30) Foreign Application Priority Data

Jun. 17, 2011 (CN) .......................... 2011 1 0164407

(51) Int. Cl.
*H04L 29/12* (2006.01)
*G06F 17/30* (2006.01)
*H04L 29/08* (2006.01)

(52) U.S. Cl.
CPC .... *H04L 61/1582* (2013.01); *G06F 17/30203* (2013.01); *H04L 67/06* (2013.01); *H04L 67/1097* (2013.01)

(58) Field of Classification Search
CPC . G06F 9/06; G06F 17/30203; H04L 61/1582; H04L 67/06; H04L 67/1097
(Continued)

(56) References Cited

U.S. PATENT DOCUMENTS 5,226,118 A * 7/1993 Baker ................ G05B 23/0232
345/440
7,590,747 B2   9/2009 Coates et al.
(Continued)

FOREIGN PATENT DOCUMENTS

CN      101605148 A    12/2009
JP      2009205201      9/2009
(Continued)

OTHER PUBLICATIONS

PCT Search Report dated Aug. 21, 2012 for PCT application No. PCT/US12/40169, 7 pages.
(Continued)

*Primary Examiner* — Brian J Gillis
*Assistant Examiner* — Amy Ling
(74) *Attorney, Agent, or Firm* — Lee & Hayes, PLLC

(57) ABSTRACT

A server receives a request to upload a file form a user device. The server may generate a unique file ID associated with the file based on the request, and transmit the file ID to the user device. The user device may divide the file to generate multiple slice files and their corresponding slice IDs. From the user device, the server receives the multiple slice files and the slice IDs. Based on the slice IDs, the server may determine storage addresses at which to store the multiple slice files in a distributed storage system using a consistent hash algorithm. The multiple slice files may be stored based on the corresponding storage addresses of the distrusted storage system.

20 Claims, 8 Drawing Sheets

(58) Field of Classification Search
USPC .................................................... 709/219
See application file for complete search history.

(56) References Cited

U.S. PATENT DOCUMENTS

| | | | |
|---|---|---|---|
| 7,694,088 B1* | 4/2010 | Bromley | G06F 11/1458 711/162 |
| 8,055,902 B2 | 11/2011 | Crichton et al. | |
| 8,296,410 B1* | 10/2012 | Myhill | G06F 11/1464 709/223 |
| 8,364,644 B1* | 1/2013 | Yadav | G06F 17/30088 707/649 |
| 8,554,748 B1* | 10/2013 | Kamity et al. | 707/694 |
| 8,825,972 B1* | 9/2014 | Tsaur | G06F 11/1453 707/646 |
| 8,898,114 B1* | 11/2014 | Feathergill | G06F 17/30159 707/648 |
| 8,947,547 B1* | 2/2015 | Millikan | H04N 1/00156 348/211.1 |
| 2004/0236869 A1 | 11/2004 | Moon | |
| 2005/0047195 A1* | 3/2005 | Seung | G11B 20/00086 365/154 |
| 2006/0259645 A1* | 11/2006 | Miyata et al. | 710/1 |
| 2007/0011501 A1* | 1/2007 | Yagawa | 714/701 |
| 2007/0038681 A1* | 2/2007 | Pierce et al. | 707/201 |
| 2007/0073990 A1 | 3/2007 | Snaman, Jr. et al. | |
| 2007/0100913 A1* | 5/2007 | Sumner | G06F 11/1453 |
| 2008/0126357 A1 | 5/2008 | Casanova et al. | |
| 2008/0172718 A1 | 7/2008 | Bradley | |
| 2008/0215662 A1* | 9/2008 | Kondo | G06F 17/30867 709/201 |
| 2009/0279462 A1* | 11/2009 | Luo et al. | 370/310 |
| 2009/0319530 A1 | 12/2009 | Hoertnagl et al. | |
| 2010/0011061 A1 | 1/2010 | Hudson et al. | |
| 2010/0070764 A1* | 3/2010 | Ishii | G06F 11/1453 713/168 |
| 2010/0232404 A1 | 9/2010 | Chen et al. | |
| 2010/0312749 A1 | 12/2010 | Brahmadesam et al. | |
| 2010/0332751 A1* | 12/2010 | Quigley et al. | 711/114 |
| 2011/0010421 A1 | 1/2011 | Chavez et al. | |
| 2011/0016091 A1* | 1/2011 | Prahlad | G06F 11/1453 707/654 |
| 2011/0055161 A1 | 3/2011 | Wolfe | |
| 2011/0082908 A1* | 4/2011 | Ban | 709/213 |
| 2011/0125792 A1 | 5/2011 | Fukuda | |
| 2011/0213928 A1* | 9/2011 | Grube et al. | 711/114 |
| 2011/0225129 A1* | 9/2011 | Agrawal | G06F 17/30156 707/692 |
| 2011/0246643 A1 | 10/2011 | Kubota | |
| 2011/0289194 A1 | 11/2011 | Lee | |
| 2011/0307457 A1* | 12/2011 | Ishii | G06F 17/30283 707/692 |
| 2012/0110260 A1 | 5/2012 | Chavda et al. | |
| 2012/0290641 A1* | 11/2012 | Enko | G06F 17/30067 709/203 |
| 2013/0007150 A1* | 1/2013 | Hertz | H04L 51/32 709/206 |
| 2013/0086442 A1* | 4/2013 | Baptist et al. | 714/752 |

FOREIGN PATENT DOCUMENTS

| | | |
|---|---|---|
| JP | 2010072740 | 4/2010 |
| WO | 2010100733 | 9/2010 |

OTHER PUBLICATIONS

Translated Chinese Office Action dated Jul. 29, 2014, for Chinese Patent Application No. 201110164407.4, foreign priority application of U.S. Appl. No. 13/576,213, 19 pgs.
Partial European Search Report dated Mar. 12, 2015 for European Patent Application No. 12799809.4, 6 pages.
Extended European Search Report dated Jul. 2, 2015 for European Patent Application No. 12799809.4, 13 pages.
European Office Action dated Feb. 29, 2016 for European Patent Application No. 12799809.4, a counterpart foreign application of U.S. Appl. No. 13/576,213, 5 pages.
Translated Japanese Office Action dated Apr. 19, 2016 for Japanese Patent Application No. 2014-515852, a counterpart foreign application of U.S. Appl. No. 13/576,213, 10 pages.
Translated Japanese Office action dated Dec. 27, 2016 for Japanese Patent Application No. 2014-515852, a counterpart foreign application of U.S. Appl. No. 13/576,213, 8 pages.

* cited by examiner

FILE PROCESSING METHOD, SYSTEM AND SERVER-CLUSTERED SYSTEM FOR CLOUD STORAGE

CROSS REFERENCE TO RELATED PATENT APPLICATIONS

This application is a national stage application of an international patent application PCT/US12/40169, filed May 31, 2012, which claims priority to Chinese Patent Application No. 201110164407.4, filed on Jun. 17, 2011, entitled "File Processing Method, System and Server-clustered System for Cloud Storage," which applications are hereby incorporated by reference in their entirety.

TECHNICAL FIELD

This disclosure relates to the field of data processing. More specifically, the disclosure relates to cloud storage-based file processing.

BACKGROUND

Cloud computing is a result of development of distributed computing, parallel computing, and grid computing. Cloud computing divides a massive program into a number of smaller sub-programs that perform computation using multiple servers and then output computing results. Cloud storage is an extension of cloud computing using functions such as clustering applications, network technologies, and/or distributed file systems to put together a large number of different storage devices via a network. Current cloud storage schemes, however, may present some problems (e.g., resource waste) when uploading large files from a user device to servers.

SUMMARY

A server receives an upload request to upload a file from a user device. The server may generate a file ID for the file and transmit the file ID to the user device. The user device may divide the file to generate multiple slice files and associated slice IDs. The user device may transmit the multiple slice files and their slice IDs to the server. The server may then compute storage addresses to store the multiple slice files in a cloud-based distributed storage system based on the slice IDs. The multiple slice files may be stored based on the storage addresses.

In some aspects, the server may receive a duplicate determination request to determine that a slice file of the multiple slice files is stored in the storage system. The slice file may be stored if a slice ID does not exist in the storage system.

In some aspects, the server may receive a download request to download a file that has been uploaded to the storage system. The server may determine multiple slice files associated with the uploaded file in the storage system. The server may then generate the uploaded file and transmit it to the user device.

In some aspects, the server may receive a delete request to delete a file that has been uploaded to the storage system. The server may delete multiple slice files associated with the uploaded file if count numbers of slice IDs associated with the slice files are zero.

BRIEF DESCRIPTION OF THE DRAWINGS

The Detailed Description is described with reference to the accompanying figures. The use of the same reference numbers in different figures indicates similar or identical items.

DETAILED DESCRIPTION

Figure 1:
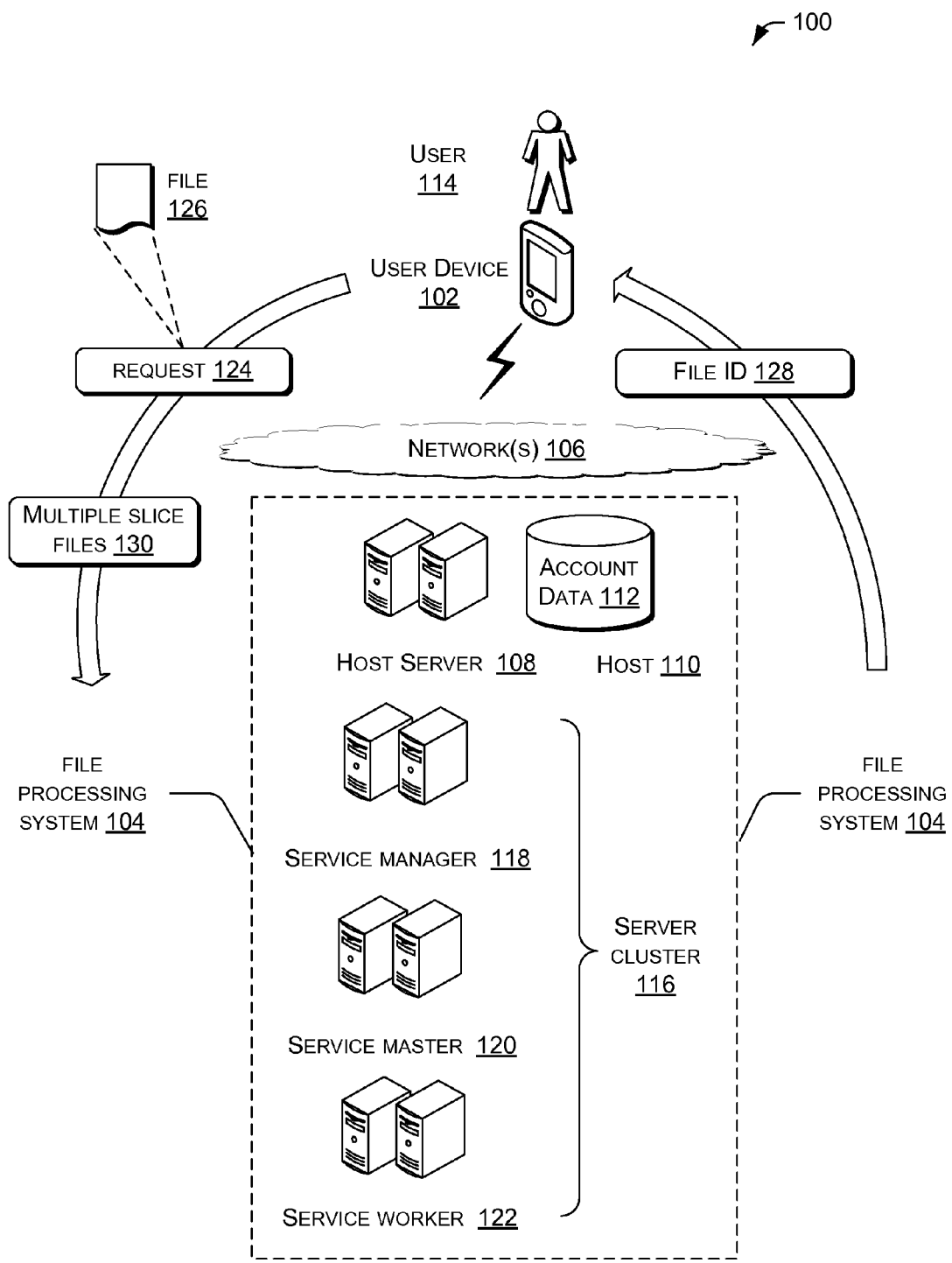
FIG. 1 is a block diagram of an illustrative environment that supports file processing using cloud storage.

FIG. 1 is a block diagram of an illustrative architecture 100 that supports file processing using cloud storage. The architecture 100 may include a user device 102 and a file processing system 104. The user device 102 (e.g., a computing device) may connect to one or more networks 106 to exchange information with the file processing system 104. The file processing system 104 may include a host server 108 of a host 110 that stores account data 112 for a user 114. In some embodiments, the file processing system 104 may also include a server cluster 116 that may further include a service manager 118, a service master 120, and service worker 122. In some embodiments, the file processing system 104 may be implemented as a distributed storage system.

In accordance with various embodiments of this disclosure, the user device 102 may transmit a request 124 to upload a file 126 to the file processing system 104. The request 124 may include a user ID of the user 114, a title of the file 126, a location or file path of the file 126 in the user device 102, and other information regarding the user 114 and the file 126. Based on information included in the request 124, the file processing system 104 may generate a unique file identifier (ID) 128 for the file 126, and then transmit the file ID 128 to the user device 102. The user device 102 may divide the file 126 to generate multiple slice files 130. The multiple slice files 130 may be divided based on a predetermined size. Each slice file of the multiple slice files 130 is associated with a slice ID that is generated based on a predetermined hash function (e.g., Message-Digest Algorithm 5 (MD5)). Each slice file has a slice ID and associated data.

Upon receiving the multiple slice files 130, the file processing system 104 may compute a storage address of a slice file of the multiple slice files 130. Based on the computed storage address, the file processing system 104 may store the slice file. While storing the multiple slice files 130, the file processing system may maintain the corresponding relationship between the file ID 128 and the slice IDs of the multiple slice files 130. Based on the corresponding relationship, the user device may transmit a request to download the file 126, determine duplication of the file 126, and delete the file 126, which are described in greater detail with reference to FIGS. 2-7 below.

In some embodiments, client-side software may be operated on the user device 102 to upload, download, or delete the file 126. These operation commands can be converted into Hypertext Transfer Protocol (HTTP) requests and uploaded to the file processing system 104 for processing.

Figure 2:
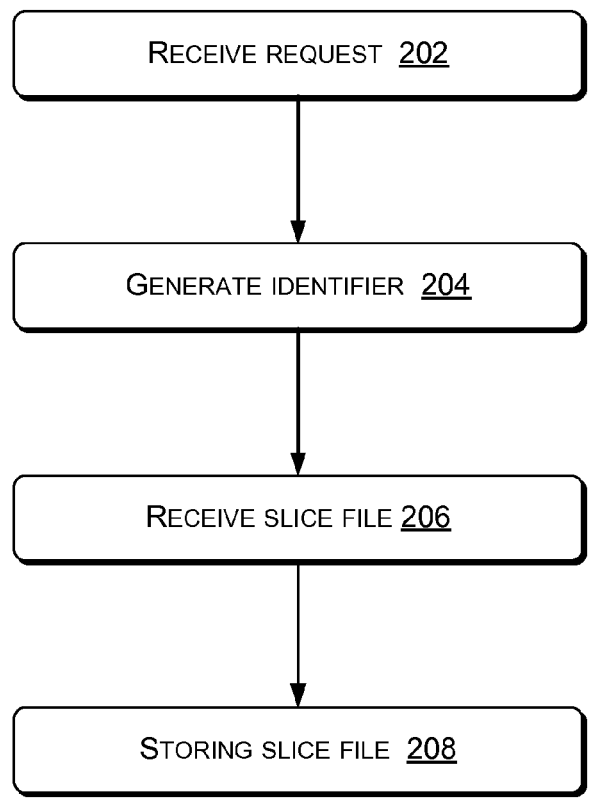
FIG. 2 is a flow diagram of an illustrative process to process files using cloud storage.

FIG. 2 is a flow diagram of an illustrative process 200 to process files using cloud storage. At 202, the file processing system 104 may receive the request 124 to upload the file 126. In some embodiments, the host server 108 may receive the request 124 from the user device 102 to request for uploading the file 126 to the server cluster 116.

At 204, the file processing system 104 may generate the file ID 128 and transmit it to the user device 102. In some embodiments, the server cluster 116 may generate the file ID, and host server 108 may return the file ID 128 to the user device 102. In some embodiments, the host server 108 may send a request to the server cluster 116 to acquire the file ID 128 for the file 126. The server cluster 116 may allocate the file ID to the file 126 based on the request, and the server cluster 116 may send the file ID back to the host server 108. The host server 108 may then send the file ID to the user device 102.

In some embodiments, the server cluster 116 may store a large number of files, and allocate a unique file ID to each file. For example, the stored files may be assigned the unique file ID using sequentially increased numbers (e.g., 1, 2, . . . N). After the file ID 128 has been allocated to the file 126 associated with the request 124, the server cluster 116 may record the association between the file ID 128 and information contained in the request 124. The information contained in the request 124 may include a user ID, a file name, a file path, and other information regarding the file and the user 114. Based on the information, the server cluster 116 may manage and maintain the file.

At 206, the file processing system 104 may receive the multiple slice files 130 from the user device. In some embodiments, the file 126 may be divided to generate the multiple slice files 130. Each slice file of the multiple slice files 130 may be assigned a unique slice ID.

In some embodiments, the user device 102 may divide the file 126 based on a predetermined size and generate the multiple slice files 130. When the remaining file chunk length after division is less than the predetermined size, the remaining file is designated as one slice file. In some embodiments, the user device 102 may divide the file 126 based on Message-Digest Algorithm 5 (MD5). In these instances, the MD5 hash function may be used to compute a slice ID for every slice file such that the slice ID can uniquely identify the slice file.

In some embodiments, the user device 102 may upload a slice file data package to the host server 108. The slice file data packet may include the file ID 128 and the multiple slice files 130. The multiple slice files 130 may include a slice ID and corresponding data for each slice file. The host server 108 may then send the slice data of every slice file from the slice file data packet to a corresponding service worker 122 in the server cluster 116 for storage. The corresponding relationship between the file ID 128 and slice IDs of the multiple slice file 130 are maintained.

Suppose that the user device 102 uploads the file 126 to the server cluster 116 for the first time. As a result, the user device 102 may upload the file ID 128 and the slice IDs of the multiple slice files 130 to the host server 108. The host server 108 may then send a query request including the file ID 128 and the slice IDs of the multiple slice files 130 to the server cluster 116. The query request may be used to request a storage address of the service worker 122 to store a slice file of the multiple slice files 130. After the server cluster 116 receives the query request, it can save the corresponding relationship between the file ID 128 and the slice IDs.

At 208, the file processing system 104 may compute the storage address of the service worker 122 to store a slice file or every slice file of the multiple slice files 130. In some embodiments, the server cluster 116 may then return the service worker addresses to the host server 108. The host server 108 may then send data of corresponding slice file to the service worker 122 based on the storage address of the service work 122. In these instances, the service worker 122 can store the corresponding relationship between the slice ID and corresponding data of every slice file of the multiple slice files 130.

In some embodiments, the server cluster 116 may compute the storage address of the service work 122 to store a slice file of the multiple slice files 130. For example, suppose that the server cluster 116 has N servers that are logically arranged in a ring. Each server of the N servers is numbered in a clockwise direction, wherein numbers may be selected from 0 to N−1. The server cluster 116 may compute the storage address by taking modulus of N. Further suppose that a remainder after taking the modulus is K. As results, beginning at server number 0 in the abovementioned hash ring and moving in a clockwise direction, the $K_{th}$ server on the hash ring is determined and designated as the server to store the slice file.

In some embodiments, prior to uploading the file 126, the user device 102 may transmit a duplicate count request to the host server 108 to determine whether data associated with a slice ID is stored in the server cluster 116. In these instances, the user device 102 may divide the file 126 to generate the multiple slice files 130 and then compute a slice ID associated with each slice file of the multiple slice files 130 based on an MD5 hash function. The user device 102 may then transmit to the host server 108 the duplicate count request, which includes the slice ID of every slice file. The host server 108 may send the duplicate count request to the server cluster 116 based on the slice ID. The server cluster 116 may determine whether it has stored data associated with the slice ID.

In the event that the data associated with the slice ID is stored, the file processing system may transmit duplication information associated with the slice ID to the user device 102. Based on the duplication information, the user device may upload a slice file data packet including non-duplicated slice files to the host server 108. Therefore, the host server 108 may compute storage addresses of the server cluster 116 for the non-duplicated slice files. Based on these storage addresses, the host server 108 may send corresponding data to the service worker 122 to store.

In some embodiments, while conducting a repeat count for uploaded files, the host server 108 may also save the corresponding relationship between a user ID of the user 114 and the file ID 128. In these instances, when different users upload the same file (e.g., the file 126), the host server may store the corresponding relationships between, for example, the file ID 128 and multiple user IDs.

In some embodiments, the server cluster 116 may set a reference counter for every slice ID, wherein the count value for every reference counter may initially be designated as zero. Based on the duplicate count results, the server cluster 116 may modify the count value. For example, when a slice ID repeats (e.g., data of a slice ID associated with multiple users is repeatedly stored), the count value associated with the slice ID may increase by one.

Figure 3:
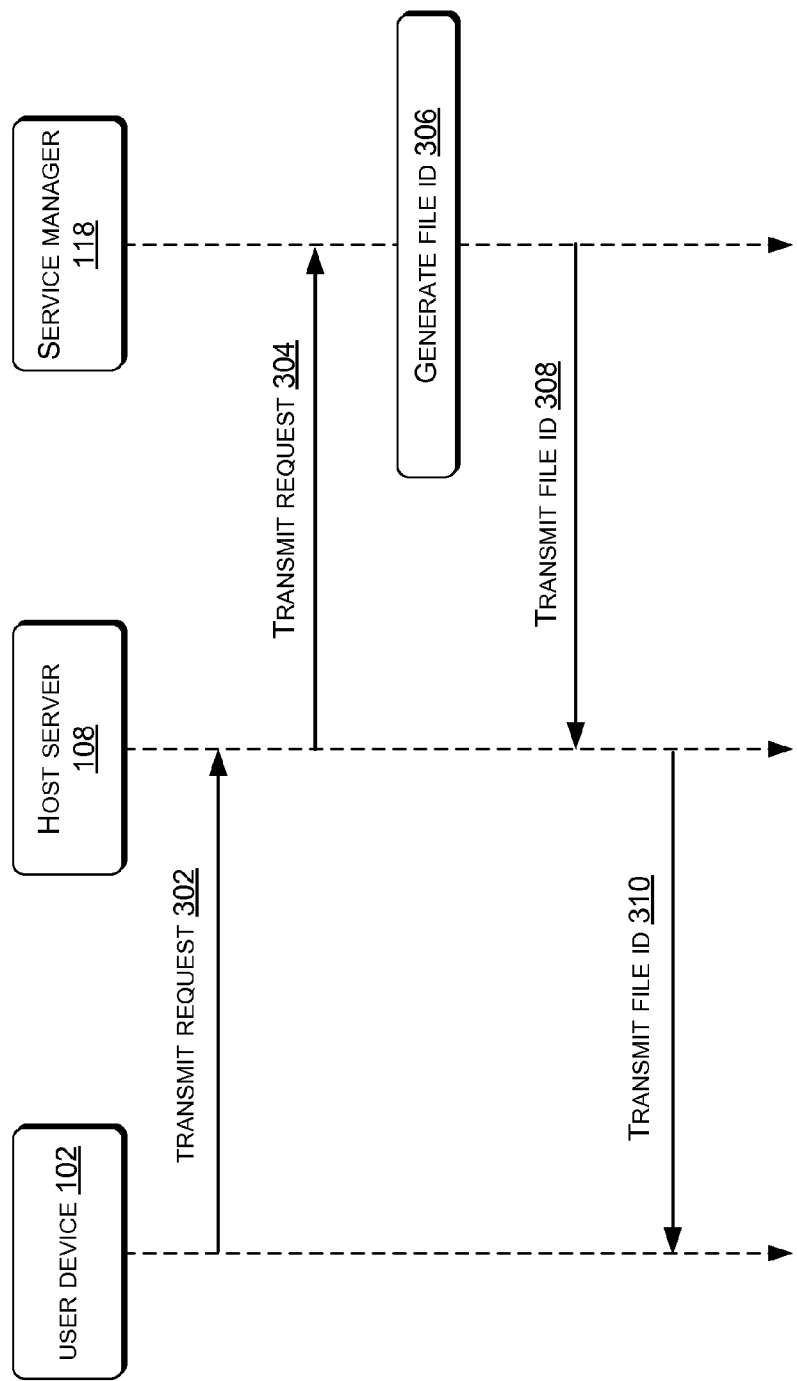
FIG. 3 is a flow diagram of an illustrative process to upload files using cloud storage.

FIG. 3 is a flow diagram of an illustrative process 300 to upload files using cloud storage. At 302, the user device 102 may transmit the request 124 to the host server 108. The request 124 may include a user ID of the user 114, a file name of the file 126, and a file path of the file 126. At 304, the host server 108 may transmit the request 124 to the service manager 118.

At 306, the service manager 118 may conduct universal encoding for the file 126 and generate the file ID 128. The server cluster 116 may contain an enormous number of files, and the service manager 118 in the server cluster 116 may allocate a unique file ID to every file of the enormous number of files.

For example, the service manager 118 may assign file IDs using sequentially increasing numbers. After the file ID 128 is associated with the file 126, the service manager may store the corresponding relationship between the file ID 128 and the file 126. Based on the corresponding relationship, the server cluster 116 may manage and maintain the file 126.

At 308, the service manager 118 may return the file ID 128 of the file 126 to the host server 108. The host server 108 may then transmit the file ID to the user device 102.

Figure 4:
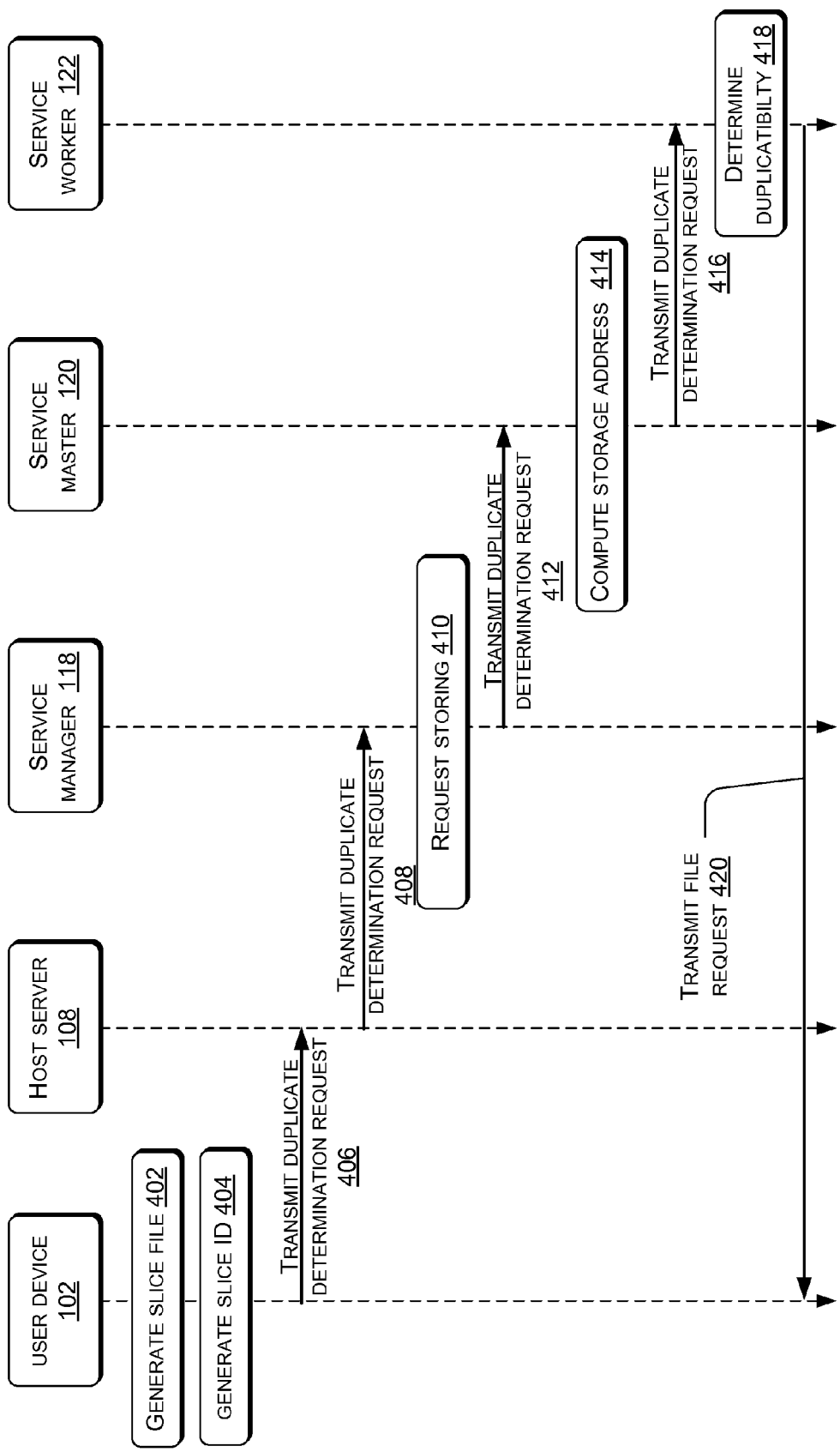
FIG. 4 is a flow diagram of an illustrative process to determine information regarding duplication of a file stored in cloud storage.

FIG. 4 is a flow diagram of an illustrative process 400 to determine information regarding duplication of a file stored in cloud storage. At 402, the user device 102 may divide the file 126 to generate the multiple slice files 130. In some embodiments, the user device 102 may divide the file 126 based on a predetermined file size. The predetermined file size may be a numerical value that conforms to an optimal file size derived from testing and calculations. For example, when the optimal value is 128 k, the new file is sequentially cut up into a number of slice files with a file size of 128 K. In some instances, the file 126's size is not an integer multiple times of 128 K. Accordingly, data of less than 128 K remaining after the division can be designated as a slice file.

At 404, based on data of the multiple slice files 130, the user device may compute a unique slice ID for every slice file of the multiple slice files 130 using an MD5 hash function.

At 406, the user device 102 may transmit a duplicate determination request to the host server 108. The duplicate determination request may include a slice file data and its associated slice ID. Because it is possible that the file 126 to be uploaded by the user 114 is an existing file that has been partially revised, retransmitting the entire file data would lead to redundant data in the server cluster 116. Therefore, in some embodiments, the user device may transmit the duplicate determination request to the host server 108, wherein the duplicate determination request may include the slice IDs of every slice file.

At 408, the host server 108 may transmit the duplicate determination request to the service manager 118. At 410, the service manager 118 may request that the service master 120 to store the multiple slice files 130. In some embodiments, the service manager 118 may request the service master 120 to store the multiple slice files 130 using a consistent hash algorithm. The service master 120 may request that the service worker 122 to store the multiple slice files 130 using the consistent hash algorithm.

At 412, the service manager may transmit the duplicate determination request to the service master 120. The service master 120 may, at 414, use a consistent hash algorithm to compute storage addresses of the service worker 122 to store the multiple slice files 130. When the service master 120 transmits a duplicate determination request to the service worker 122, the request may include the slice IDs corresponding to the slice data stored in that service worker 122 based on the storage addresses computed using a consistent hash algorithm.

At 416, the service master 120 may transmit the duplicate determination request to the service worker 122 based on computed storage addresses. At 418, the service worker 122 may determine whether the slice IDs of the duplicate determination request have already been saved. If a slice ID from the repeat count request is found in the service worker 122, the service master 120 may determine that the service worker has already saved the slice data corresponding to this slice ID. Accordingly, the slice data corresponding to the slice ID is a duplicate; so there is no need for it to be uploaded again.

At 420, the service worker 122 may transmit information on whether the slice file is duplicated to the service master 122. The service worker 122 may only send the slice IDs of the non-duplicate slice files back to the service master 120, while also returning the address of the service worker 122 storing the slice file. The information may be transmitted to the user device 102.

In some embodiments, the service manager 118 may save the slice IDs of previously uploaded slice files every time a new file is uploaded. In these instances, the slice ID may be transmitted directly to the service manage 118 to determine whether or not a slice file awaiting upload duplicates. If the slice ID is present, the corresponding slice file duplicates.

Figure 5:
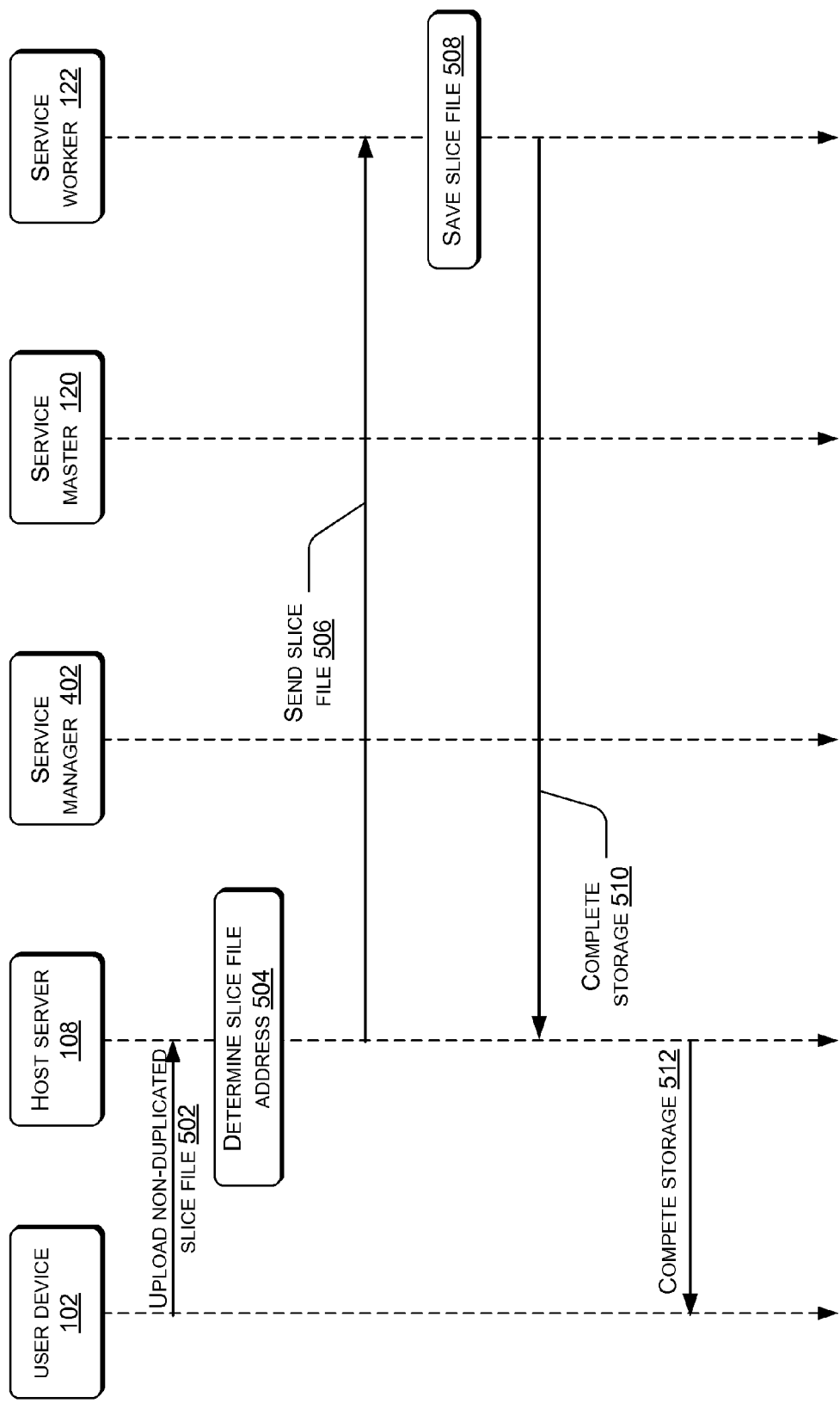
FIG. 5 is a flow diagram of an illustrative process to determine a storage address of a slice file stored in cloud storage.

FIG. 5 is a flow diagram of an illustrative process 500 to determine a storage address of a slice file stored in cloud storage. At 502, the use device 102 may determine the slice IDs and slice data of slice files that do not repeat and uploads them to the host server 108. In embodiments described in FIG. 4, the user device 102 may receive the information regarding non-duplicate slice file of the file 126. Therefore, the user device 102 may upload the slice IDs and slice data of non-duplicate slice files to the host server 108.

At 504, the host server 108 may look up a storage address of the service worker 122 storing a slice file based on the corresponding slice ID. At 506, the host service 108 may transmit the slice file to the corresponding service worker 122 based on the storage address. At 508, the service work 122 may store the received slice file.

At 510, the service worker 122 may return a reply message to the host server indicating that storage is completed. At 512, the host server 108 may transmit the storage completed message to the user device 102.

Figure 6:
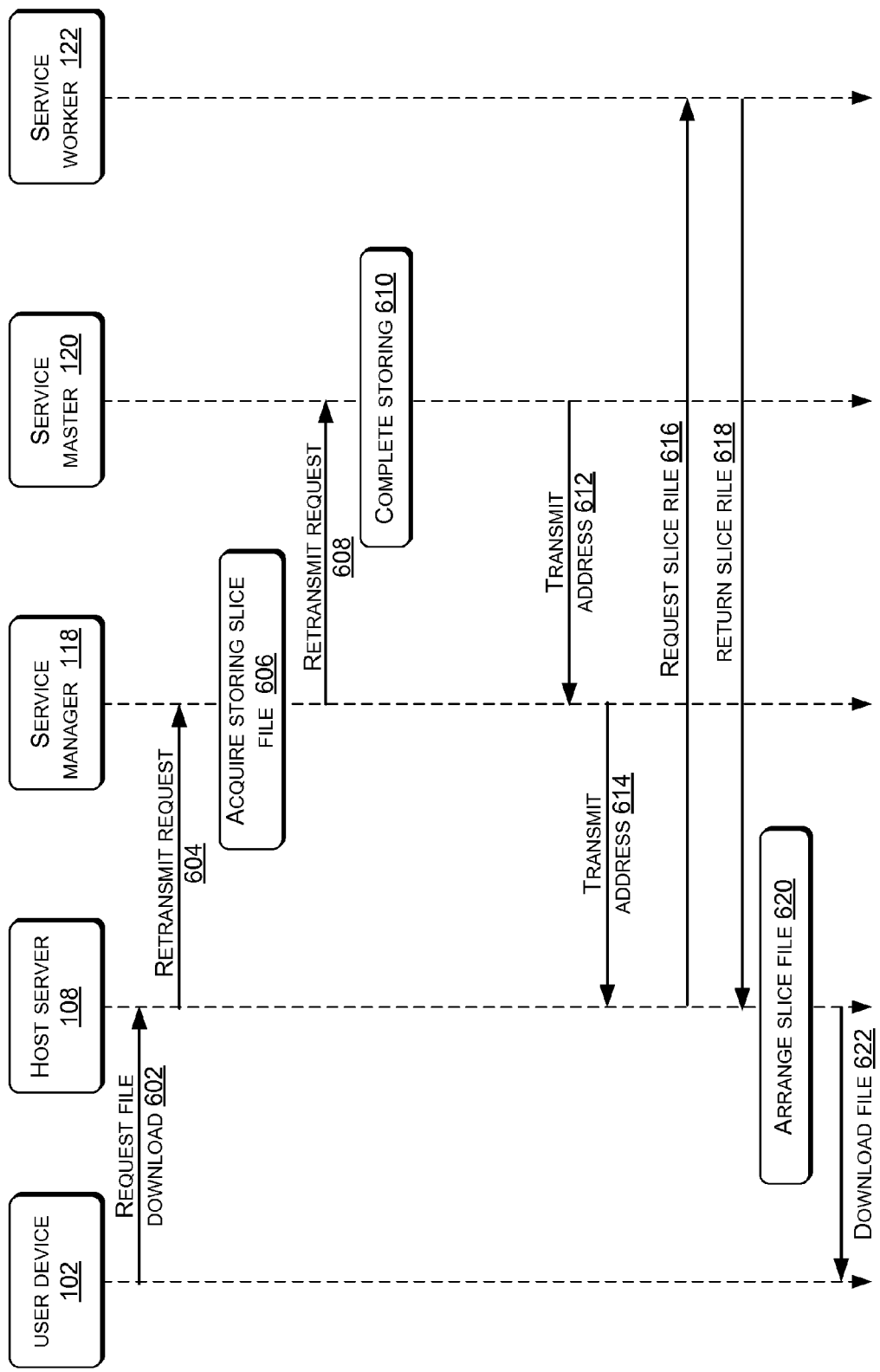
FIG. 6 is a flow diagram of an illustrative process to download files stored in cloud storage.

FIG. 6 is a flow diagram of an illustrative process 600 to download files stored in cloud storage. At 602, the user device may transmit a request to download the file 126. The request may include the file ID 128 of the file 126. At 604, the host server 108 may transmit the request to the service manager 118. The request may request information from the server cluster 116 on the multiple slice files 130 that make up the file 126.

At 606, the service manager 118 may acquire the service master 120 to store the slice files based on a consistent hash algorithm. Within the server cluster 116, a higher-level service manager can acquire a corresponding service master to store the slice files by using a consistent hash algorithm. Similarly, a higher-level service manager can acquire a corresponding service worker 122 to store slice files by using a consistent hash algorithm.

In some embodiments, based on the corresponding relationship between the file ID 128 and slice IDs saved when the file was uploaded, the service manager 118 may acquire the entire slice IDs corresponding to the file ID 128 in the request. The service master 120 may be requested to store the slice files, and the service worker 122 under the service master 120 may store the slice files based on the slice ID using the consistent hash algorithm followed during the multiple slice files 130 upload.

In some embodiments, the server master 120 may compute the storage address of the service work 122 to store a slice file of the multiple slice files 130. For example, suppose that the server cluster 116 has N servers that are logically arranged in a ring. Each server of the N servers is numbered in a clockwise direction, wherein numbers may be selected from 0 to N−1. The server cluster 116 may compute the storage address by taking modulus of N. Further suppose that a remainder after taking the modulus is K. As results, beginning at server number 0 in the abovementioned hash ring and moving in a clockwise direction, $K_{th}$ server on the hash ring is determined and designated as the server to store the slice file.

At 608, the service manager 118 may transmit the file 126's download request to the service master 120. At 610, the service master 120 may use a consistent hash algorithm to compute a storage address of the service worker 122 storing every slice file of the file 126. The service master 120 may compute the storage address using a consistent hash algorithm that is substantially the same as the computation of service master 120 under the service manager 118 in operation 606.

At 612, the service master 120 may transmit to the service manager 118 the storage addresses of the service worker 122 storing every slice file. At 614, the service manager 118 may transmit the storage addresses of the service worker 122 storing every slice file to the host server 108.

In some embodiments, at 616, the host server 108 may place a request with the corresponding service worker 122 to read the slice files based on the service worker 122 addresses. For every service worker in the server cluster 116, it might need to conduct parallel processing of download requests of the multiple slice files 130. Therefore, the service workers can package every slice file download request into tasks, enter them into the download queue, and start multiple threads to process the tasks.

At 618, the service worker 122 may transmit the slice files to the host server 108. At 620, the host server 108 may arrange the received slice files into the requested download file according to the slice sequence. The slice files returned to the host server 108 by the service worker 122 may include slice data and a slice ID of every slice file, the slice sequence of the multiple slice files 130 of the file 126, and the file ID 128. The host server 108 may take slice files with the same file ID and arrange them into a download file according to the corresponding slice sequence.

At 622, the host server 108 may transmit the requested download file to the user device 102. When the user device 102 sends a download request to the host server 108, the host server 108 can record the user ID of the user 114. After the download file is arranged, the host server 108 may transmit the download file to the user 114 based on his/her user ID.

In some embodiments, the server cluster 116 may employ a sequenced downloads of the multiple slice files 130 when completing download operations. For example, the service manager 118 may sequentially request the first slice file of the multiple slice files 130 to be downloaded. The service manager 117 may determine the service master 120 to the multiple slice files 130, and then the service master 120 may determine the service worker 122 and send a request to the service worker 122 to download the first slice file. The operation may be repeated until all of the multiple slice files 130 have been downloaded according to the slice sequence. In some embodiments, the slice sequence may be determined based on a predetermined method.

Figure 7:
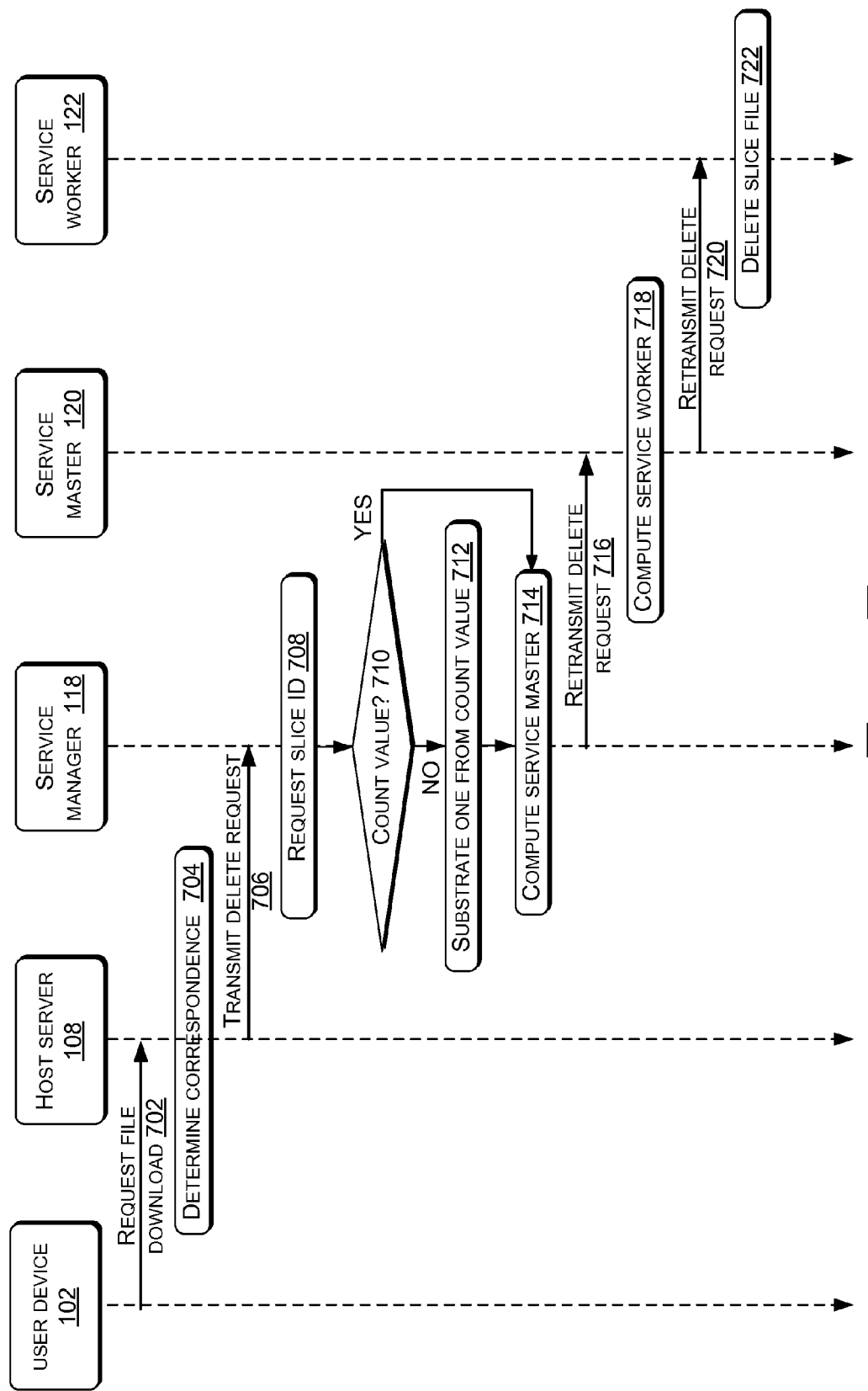
FIG. 7 is a flow diagram of an illustrative process to delete files stored in cloud storage.

FIG. 7 is a flow diagram of an illustrative process to delete files stored in cloud storage. At 702, the user device may transmit a deletion request to the host server 108 to delete a file (e.g., the file 126). The deletion request may include the file ID 128 of the file 126 to be deleted and a user ID of the user 114. In some embodiments, for a slice file uploaded for the first time, the service manager 118 can save the corresponding relationship between a slice ID of the multiple slice files 130 and the file ID 128 of the file 126. In some instances, the service manager 118 may set a reference counter for every slice ID, and the count value of this reference counter may be initially designated as zero. When a slice ID repeats (e.g., data of a slice ID associated with multiple users is repeatedly stored), the count value associated with the slice ID may increase by one.

At 704, the host server 108 may determine the corresponding relationship between the file ID 128 in the deletion request and the user ID. If the host server 108 has saved the corresponding relationship between the file ID 128 and user ID, the host server 108 may determine that the user device 102 has already uploaded a file corresponding to the file ID 128 that is used in the user device 102's execution of the delete operation.

At 706, the host server 108 may transmit the deletion request to the service manager 118. The deletion request may request information regarding the deletion from the server cluster of one or more slice files of the multiple slice files 130. At 708, the service manager 118 may request the slice IDs corresponding to the file ID.

At 710, the service manager 118 may determine whether the count value of the counter for every slice ID is zero. If the count value is not zero (i.e., the NO branch of 710, the count value may decrease by one at 712. If the count value is zero (i.e., the YES branch of 710), the service manager 118 may compute the service master 120 corresponding to the slice ID at 714 based on a consistent hash algorithm.

If the count value of a slice ID's counter is not zero, the service manager 118 may determine that the slice data corresponding to the slice ID has been repeatedly uploaded in the past. If the count value of the slice ID's counter is zero, the service manage may determine that there is just one copy of the slice data corresponding to this slice ID in the file processing system, and there is no operations performed by a user ID other than the user ID. Therefore, the slice data corresponding to the slice ID can be deleted.

At 716, the service manager 118 may transmit the delete file request to the acquired service master 120. At 718, the service master 120 may use a consistent hash algorithm to compute the storage addresses of the service worker 122 storing the slice file. In these instances, the consistent hash algorithm may be implemented as described above.

At 720, the service master 120 may transmit the request to delete slice files to the service worker 122 based on the storage address. At 722, the service worker 122 may delete the corresponding slice files it has stored based on the slice IDs.

In some embodiments, the server cluster 116 may employ a sequenced deletion of the multiple slice files 130 when completing deletion operations. For example, the service manager 118 may sequentially request the first slice file of the multiple slice files 130 to be deleted. The service manager 117 may determine the service master 120 for the multiple slice files 130, and then the service master 120 may determine the service worker 122 and send a request to the service worker 122 to delete the first slice file. The operation may be repeated until all of the multiple slice files 130 have been deleted according to the slice sequence. In some embodiments, the slice sequence may be determined based on a predetermined method.

Figure 8:
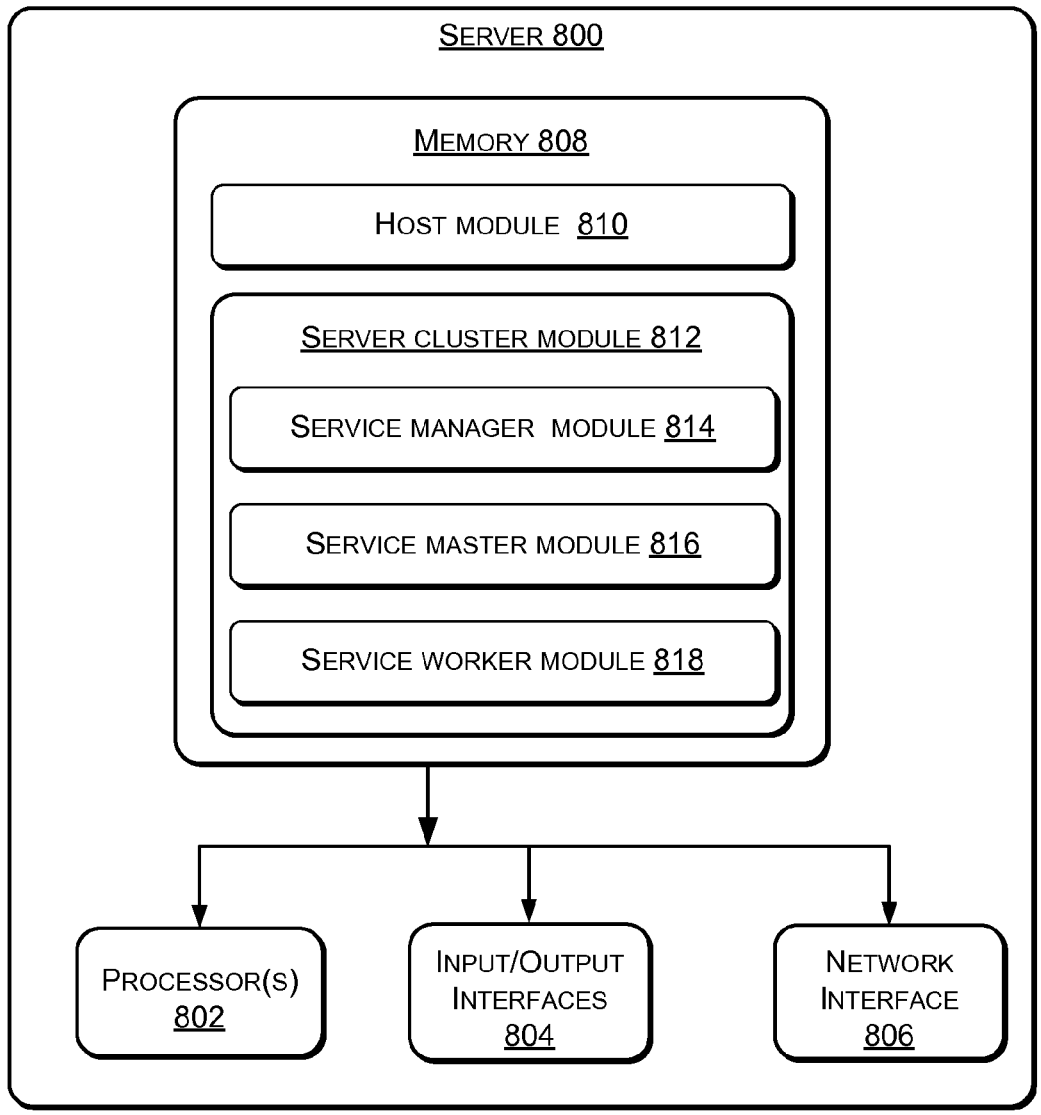
FIG. 8 is a block diagram of an illustrative server that may be deployed in the environment shown in FIG. 1.

FIG. 8 is a block diagram of an illustrative server 800 that may be deployed in the file processing system 104 shown in FIG. 1. The server 800 may be configured as any suitable server(s). In one exemplary configuration, the server 800 include one or more processors 802, input/output interfaces 804, network interface 806, and memory 808.

The memory 808 may include computer-readable media in the form of volatile memory, such as random-access memory (RAM) and/or non-volatile memory, such as read only memory (ROM) or flash RAM. The memory 808 is an example of computer-readable media.

Computer-readable media includes volatile and non-volatile, removable and non-removable media implemented in any method or technology for storage of information such as computer readable instructions, data structures, program modules, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

Turning to the memory 808 in more detail, the memory 808 may store a host module 810 and a server cluster module 812. The host module 810 may receive file upload requests sent by the user device 102, and the file upload requests are used to request that a new file be uploaded to the server cluster and to return a file ID, generated by the server cluster for the new file, to the user device 102. The user device 102 may slice the new file and generate a unique slice ID for every slice file, it uploads slice file data packets to the host module 810, and a slice file data packet includes the file ID, the slice ID of every slice file, and the slice data of every slice file. The host module 810 may send the slice data of every slice file from the slice file data packet to the server cluster module 812. The server cluster module 812 may store the slice data of every slice file in a corresponding service worker and save the correspondence between the file ID and slice ID.

In some embodiments, the user device 102 may send a duplication determination request to the host server, and the request includes the slice IDs of every slice file. The host module 810 may transmit the request to the server cluster module 812. The server cluster module 812 may search its saved slice IDs for the slice IDs of the request. If a slice ID from the request is found, it means that the slice file corresponding to that slice ID repeats. If a slice ID from the repeat count request is not found, it means the slice file corresponding to that slice ID does not repeat. The server cluster module 812 may take the information for every slice file on whether or not it repeats and sends it to the host module 810. The host module 810 may take the information on whether or not the slice files repeat and send it to the user device 102. The user device 102 may upload slice file data packets containing the slice IDs and slice data for non-duplicate slice files to the host module 810, based on the information about whether or not the slice files repeat.

In some embodiments, the host module 810 may take a query request for acquiring slice file storage addresses and send it to the server cluster. The server cluster module 812 may compute the addresses of the service workers storing every slice file using a consistent hash algorithm, based on the slice ID of every slice file. The host module 810 may to send every slice file included in the slice file data packet to a service worker for storage based on the corresponding service worker address.

In some embodiments, the user device 102 may send a file download request to the host module 810, and the file download request includes the file ID of the file the user device 102 is requesting to download. The host module 810 may send the file download request to the server cluster. The server cluster module 812 may take the addresses of the service worker 122 storing every slice file corresponding to the file ID and send them to the host module 810. The host module 810 may acquire every slice file from the service worker 122 based on the service worker storage addresses. The host module may arrange the slice files into the requested download file according to the slice sequence and sends the file to the user device 102.

In some embodiments, the host module 810 may save the correspondence between the file ID and the user ID when the file upload request also includes the user device 102's user ID. The server cluster module 812 may set a reference counter for every slice ID, and the count value of the reference counter is initialized to zero. If the slice file corresponding to the slice ID repeats, one is added to the count value of the reference counter for that slice ID.

In some embodiments, the user device 102 may send a delete file request to the host module 810, wherein the delete file request includes the file ID of the file the user device 102 is requesting to delete and the user ID. The host module 810 may send the delete file request to the server cluster when it has saved the correspondence between the file ID and user ID saved in the deletion request. The server cluster module 812 may acquire the slice IDs corresponding to the file ID, and it determines whether or not the count value of the slice ID's reference counter is zero. If the count value of the slice ID's counter is zero, the server cluster acquires addresses of the service workers storing every slice file of the file for which deletion is requested, the server cluster module 812 may transmit the delete file request to the corresponding service worker 122. If the count value of the slice ID's counter is not zero, one is subtracted from the count value of the counter for that slice ID.

The server cluster module 812 may include a service manager module 814, a service master module 816 and a service worker module 818. In some embodiments, at least one service manager, a number of service masters connected to the service manager, and a number of service workers connected to every service master. The service manager module 814 may interact with the host module 810, and the interaction data is successively transmitted down to the service master 120. The interaction data may be then transmitted by the service master 120 to the service worker 122.

The host module 810 may receive file upload requests sent by the user device 102, which are used to request that a new file be uploaded to the server cluster; to return a file ID, generated by the server cluster for the new file, to the user device 102; and to receive slice file data packets uploaded by the user device 102. The slice file data packet includes the file ID, the slice ID of every slice file, and the slice data of every slice file. The server cluster module 812 may receive the slice data of every slice file in the slice file data packets sent by the host module 810, send the slice data of every slice file to the corresponding service worker in the server cluster for storage, and save the correspondence between the file ID and slice ID.

In some embodiments, the host module 810 may receive the repeat count request sent by the user device 102, wherein the repeat count request includes the slice IDs of every slice file. The host module 810 may transmit the repeat count request to the server cluster. The server cluster module 812 may search its saved slice IDs for the slice IDs of the repeat count request. If a slice ID from the repeat count request is found, it means that the slice file corresponding to that slice ID repeats. If a slice ID from the repeat count request is not found, it means the slice file corresponding to that slice ID does not repeat. The server cluster module 812 may take the information for every slice file on whether or not it repeats and sends it to the host module 810. The host module 810 may take the information on whether or not the slice files repeat and send it to the user device 102, to enable the user device 102, based on this information, to upload slice file data packets containing the slice IDs and slice data for non-duplicate slice files to the host module 810.

In some embodiments, the host module 810 may send a query request for acquiring slice file storage addresses to the server cluster module 812. The server cluster module 812 may compute the addresses of the service workers storing every slice file using a consistent hash algorithm, based on the slice ID of every slice file. The server cluster module 812 may return the service worker 122's addresses to the host module 810. The host module 810 may send every slice file included in the slice file data packet to a service worker for storage based on the corresponding service worker address.

In some embodiments, the host module 810 may receive file download requests sent by the user device 102. The file download request may include the file ID of the file the user device 102 is requesting to download. The host module 810 sends the file download request to the server cluster. The server cluster 812 may take the addresses of the service workers storing every slice file corresponding to the file ID and send them to the host module 810. The host module 810 may acquire every slice file from the corresponding service workers based on the service worker addresses, and arrange the slice files into the requested download file according to the slice sequence and sends the file to the user device 102. In some embodiments, the host module 810 may save the correspondence between the file ID and the user ID when the file upload request includes the user device 102's user ID.

The server cluster module 812 may set a reference counter for every slice ID, and the count value of the reference counter is initialized to zero. If the slice file corresponding to the slice ID repeats, one is added to the count value of the reference counter for that slice ID.

In some embodiments, the host module 810 may receive a delete file request sent by the user device 102. The delete file request includes the file ID of the file for which the user device 102 is requesting deletion and the user ID. If the host module 810 has saved the correspondence between the file ID and user ID saved in the deletion request, it sends the delete file request to the server cluster. The server cluster module 812 may request the corresponding slice IDs based on the file ID and determines whether or not the count value of the slice ID's reference counter is zero. If the count value of the slice ID's counter is zero, the server cluster acquires the service workers storing every slice file of the file for which deletion is requested. The server cluster module 812 may transmit the delete file request to the corresponding service workers. If the count value of the slice ID's counter is not zero, one is subtracted from the count value of the counter for that slice ID. The service worker 122 may delete the slice files making up the file for which deletion is requested, after receiving the delete file request.

The foregoing describes in detail the distributed caching method and system, and parsing method and system for caching provided by the present application. The specific examples herein are utilized to illustrate the principles and embodiments of the application. The description of the embodiments above is designed to assist in understanding the method and ideas of the present disclosure. However, persons skilled in the art could, based on the ideas in the application, make alterations to the specific embodiments and application scope, and thus the content of the present specification should not be construed as placing limitations on the present application.

What is claimed is:

1. One or more computer-readable media storing computer-executable instructions that, when executed by one or more processors associated with a server, instruct the one or more processors to perform acts comprising:
    receiving an upload request to upload a file from a user device, the upload request including at least a user identifier (ID), a file name, and location information of the file in the user device;
    generating a file ID for the file using sequentially increased numbers and the location information of the file in the user device that is included in the upload request;
    transmitting the file ID to the user device;
    receiving a duplicate determination request including the file ID and multiple slice IDs from the user device, wherein each slice ID of the multiple slice IDs is generated and associated with a respective slice file of multiple slice files, and the multiple slice files are generated by dividing the file;
    determining whether one or more duplicate slice IDs exist in the multiple slice IDs that individually correspond to the multiple slice files associated with the file in response to receiving the duplicate determination request from the user device;
    sending respective one or more slice IDs of one or more non-duplicate slice files associated with the file to the user device after the determining; and
    receiving a slice file package including at least the file ID and the one or more non-duplicate slice files from the user device.

2. The one or more computer-readable media of claim 1, wherein the acts further comprise storing the slice file package such that the file ID is associated with the respective one or more slice IDs of the one or more non-duplicate slice files, and storing the slice file package includes:
    computing a storage address of an individual slice file of the one or more non-duplicate slice files using a consistent hash algorithm for the respective one or more slice IDs; and
    storing the individual slice file based on the storage address.

3. The one or more computer-readable media of claim 1, wherein the one or more non-duplicate slice files comprise divisions of the slice file package that are of a predetermined size.

4. The one or more computer-readable media of claim 1, wherein the acts further comprise:

receiving an additional upload request to upload an additional file associated with the file ID, the additional upload request being associated with an additional user ID;

determining that the additional file comprises a duplicate of an individual slice file of the multiple slice files;

assigning a count number to an individual slice ID associated with the individual slice file of the slice files, the count number being set as zero;

determining that the duplicate of the individual slice file is associated with the individual slice ID; and resetting the count number to be one after the duplicate of the individual slice file is stored in response to the additional upload request.

5. The one or more computer-readable media of claim 1, wherein each slice file of the multiple slice files includes a slice ID and data associated with the slice ID.

6. The one or more computer-readable media of claim 5, wherein each slice file of the multiple slice files is assigned a respective slice ID using a hash function.

7. The one or more computer-readable media of claim 1, wherein the acts further comprise:

setting reference counters for the multiple slice IDs of the multiple slice files, wherein a count value of each reference counter is initially set at zero; and modifying a count value of a corresponding reference counter of an individual slice ID of the multiple slice IDs based on one or more of the duplicate determination request or a deletion request.

8. The one or more computer-readable media of claim 1, wherein the acts further comprise recording an association among the file ID, the user ID, the file name and the location information of the file in the user device that are included in the upload request.

9. A computer-implemented method comprising:

receiving a request to upload a file from a user device, the request including at least a user identifier (ID), a file name, and location information of the file in the user device;

generating a file ID for the file using sequentially increased numbers and the location information of the file in the user device that is included in the request;

transmitting the file ID to the user device;

receiving a duplicate determination request including the file ID and multiple slice IDs from the user device, wherein each slice ID of the multiple slice IDs is generated and associated with a respective slice file of multiple slice files, and the multiple slice files are generated by dividing the file;

determining whether one or more duplicate slice IDs exist in the multiple slice IDs that individually correspond to the multiple slice files associated with the file in response to receiving the duplication determination request from the user device;

sending respective one or more slice IDs of one or more non-duplicate slice files associated with the file to the user device after the determining; and receiving a slice file package including at least the file ID and the one or more non-duplicate slice files from the user device.

10. The computer-implemented method of claim 9, further comprising computing a storage address for an individual slice file of the multiple slice files, wherein computing the storage address comprises computing the storage address using a consistent hash algorithm for the multiple slice IDs associated with the multiple slice files.

11. The computer-implemented method of claim 10, further comprising storing the individual slice file based on the storage address, wherein the storing the individual slice file includes associating the individual slice file with the file ID of the file.

12. The computer-implemented method of claim 9, wherein the one or more non-duplicate slice files of the multiple slice files comprise divisions of the slice file package that are of a predetermined size.

13. The computer-implemented method of claim 9, further comprising:

determining, at least partly responsive to receiving the duplicate determination request, that an individual slice file associated with an individual slice ID of the multiple slice IDs is not stored; and storing the individual slice file based on the individual slice ID.

14. The computer-implemented method of claim 9, further comprising:

receiving a download request from an individual user device to download the file;

computing storage addresses of the multiple slice files using a consistent hash algorithm for the multiple slice IDs corresponding to the multiple slice files;

generating the file based on the multiple slice files; and transmitting the file to the individual user device.

15. The computer-implemented method of claim 9, further comprising:

receiving an additional upload request to upload an additional file associated with the file ID, the additional upload request being associated with an additional user ID;

determining that the additional file comprises a duplicate of an individual slice file of the multiple slice files;

assigning a count number to an individual slice ID associated with the individual slice file of the multiple slice files, the count number being set as zero;

determining that the duplicate of the individual slice file is associated with the individual slice ID;

resetting the count number to be one after the duplicate of the slice file is stored in response to the additional upload request.

16. The computer-implemented method of claim 9, further comprising:

assigning a count number to an individual slice ID associated with an individual slice file of the multiple slice files, the count number being set as zero;

receiving a delete request to delete the individual slice file; and deleting the individual slice file based at least in part on receiving the delete request determining that the count number associated with the individual slice ID is zero.

17. A user device comprising:

one or more processors;

memory storing executable instructions that, when executed by the one or more processors, to cause the one or more processors to perform acts comprising:

transmitting a upload request to upload a file to a server, the upload request including at least a user identifier (ID), a file name, and location information of the file in the user device;

receiving a file ID associated with the file from the server, the file ID being generated based at least in part on sequentially increased numbers and the location information of the file in the user device included in the upload request;

dividing the file into multiple slice files;

generating multiple slice IDs and associating each of the multiple slice IDs with a respective slice file of the multiple slice files;

transmitting a duplicate determination request including the file ID and the multiple slice IDs to the server;

receiving duplication information including respective one or more slice IDs of one or more non-duplicate slice files associated with the file, wherein one or more of the multiple slice IDs are determined to be duplicate slice IDs that correspond to duplicate slice files of the multiple slice files; and transmitting a slice file data packet including at least the file ID and the one or more non-duplicate slice files of the multiple slice files.

18. The system of claim 17, wherein each slice file of the multiple slice files includes data associated with the slice ID.

19. The system of claim 17, wherein the upload request further includes a title of the file.

20. The system of claim 17, wherein the slice file data package further includes respective one or more slice IDs of the one or more non-duplicate slice files, and respective data of the one or more non-duplicate slice files.

* * * * *